Jan. 14, 1930.  E. C. GASKILL  1,743,964
ZINC OXIDE AND MANUFACTURE THEREOF
Filed Nov. 17, 1926
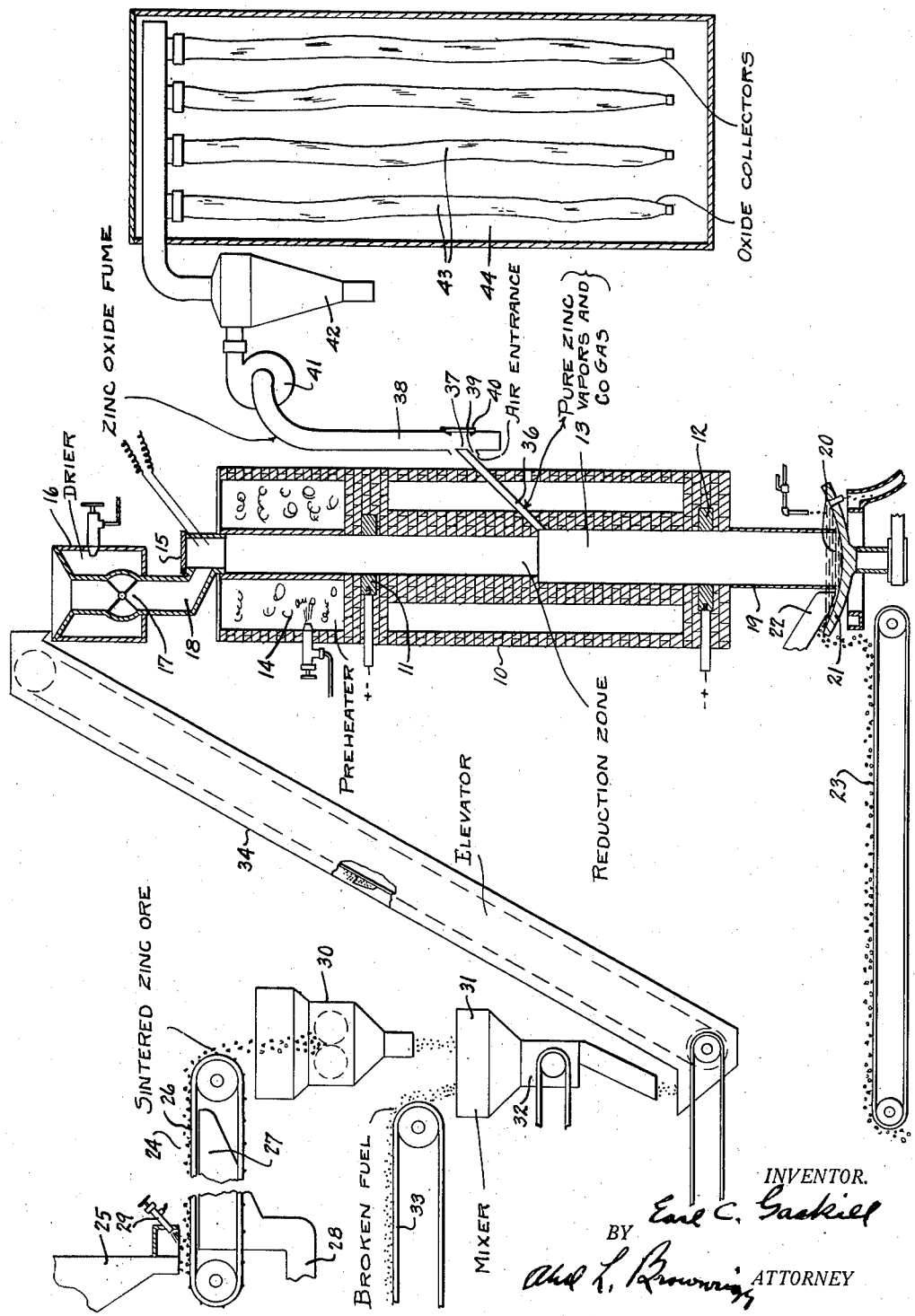
INVENTOR.
Earl C. Gaskill
BY
ATTORNEY Patented Jan. 14, 1930

1,743,964

UNITED STATES PATENT OFFICE

EARL C. GASKILL, OF RED BANK, NEW JERSEY, ASSIGNOR TO ST. JOSEPH LEAD COMPANY, OF NEW YORK, N. Y., A CORPORATION OF NEW YORK

ZINC OXIDE AND MANUFACTURE THEREOF

Application filed November 17, 1926. Serial No. 148,802.

This invention relates to an improved process for the production of zinc oxide.

As is well known there are two general processes or methods for producing zinc oxide, which have gone into extensive and universal use. One of these is the French process which involves the preliminary production of spelter or metallic zinc, volatilizing of the metallic zinc in retorts, the issuing zinc vapor being brought into contact with air and the resulting oxide fume being then passed into chambers in which the oxide is collected. This indirect method of treatment, which involves the reduction of ore to form spelter and then the re-treatment of the spelter to produce oxide, produces a high grade product but the process is costly because of the two operations involved.

The other process is the American process in which zinc ore, intermixed with fine anthracite, is charged into a furnace provided with a perforated under grate through which a blast of air is delivered during the operation. The products of combustion resulting from the burning of the anthracite and the oxide fume thus produced are together passed into the collecting system which includes vertically suspended bags through which the combustion gases can pass leaving the oxide in the bags. This method or process of producing zinc oxide is relatively less expensive than the French process but the ultimate product is inferior to the product resulting from the practice of the French process.

The chief objection to the American process resides in the presence of acid forming sulphur compounds which are oxidized along with the zinc and carried over into the finished product. Sulphur compounds, such as sulphites and sulphates, have detrimental effects on rubber and on paint products in which zinc oxide is used and, as a result of this, it has become the standard practice to grade zinc oxide in accordance with its sulphur content, the higher grades of oxide, of course, containing the lesser content of sulphur.

Another objection to the production obtained by the practice of the American process resides in a relative coarseness and lack of uniformity of size of the particles in comparison with the quality of the product obtained by the French process. The higher grades of oxide produced in the French process are extremely uniform and fine and the oxide possesses a flocculency which tends to produce a considerable volume and corresponding lightness of mass.

The process herein described produces a moderate degree of fineness and a relatively high degree of uniformity of size. I find the average particle size to range between .4 microns and .25 microns. This degree of fineness is well adapted for many uses to which zinc oxide is put and particularly for use in the manufacture of rubber. For this purpose, the quality having the relative coarseness of that typical oxide made heretofore by the American process is unsuited by reason of the slowness with which rubber cures when oxide of such character is employed as an ingredient. On the other hand, an oxide having extreme fineness is equally unsuited for this purpose for the reason that a rapidity of action takes place which results in the premature curing of the rubber before completion of the forming processes. I have found that oxide of the fineness herein referred to as characteristic of oxide formed by the new process, that is, between an average particle size of .4 and .25 microns, is exactly suited for this purpose and produces a speed of cure perfectly adapted to the conditions under which the rubber making operations are carried on.

It is a general object of the present invention to provide a process for the production of zinc oxide which will be free from the objections pointed out in connection with the older processes and which, at the same time, embodies the meritorious features of both the older processes.

The present invention comprises a method or process for the production of zinc oxide which involves the reduction of zinc ore in an electric furnace of the resistor type which makes possible the provision of a closed system in which no air can find its way into the presence of the ore being reduced. The provision of a completely reducing atmosphere, which is thus attained, results in the retention of such sulphur as is present in the ore in the furnace since no oxygen is present to combine with the sulphur and produce sulphur dioxide which in the older type of treatment of the ore passes out of the furnace along with the zinc vapor.

A pronounced characteristic of the process herein described is that practically nothing leaves the furnace chamber by way of the vapor delivering tuyères except pure metal vapors and carbon monoxide gas.

In addition to the utilization of an electric furnace to provide a closed system in the volatilization and oxidation of zinc in a sulphur-free condition, the electric furnace also lends itself to an absolute control of the amount of sulphur contained in the ultimate product. It is well known that the presence of traces of other metal oxides in a zinc oxide product interferes with a proper functioning of zinc oxide as a pigment in the manufacture of paint. It has been found that the presence of definite small proportions of sulphur will have the effect of changing the foreign metal oxides into sulphates which are white in color and do not detract from the use of the white oxide as a pigment. Since the zinc oxide formed by the process described produces a wholly sulphur-free product, the precise measured quantities of sulphur needed to change the foreign oxides into sulphates can be readily supplied so that the sulphur content of the product can be definitely controlled.

A feature of the invention resides in the method of converting the zinc vapor formed in the furnace into zinc fume. In order to carry out this important step in the operation and obtain zinc oxide of the uniform fineness desired, I have found that, instead of burning the zinc vapor in the open air, by burning the vapor immediately at its point of entry into a closed receptacle into which air is drawn with the vapor, a transformation of the zinc vapor into zinc fume is produced. This transition of zinc vapor into zinc fume is accompanied by a moderate cooling, as distinguished from a severe chilling, of the fume, such as would take place were a strong blast of air to be applied to zinc fume immediately after combustion of zinc vapor takes place in the open air.

Other features of the invention will be hereinafter referred to.

In the drawing a single diagrammatic view is used to illustrate an embodiment of apparatus by which the process can be carried out.

Referring to the drawings for a more detailed description of the invention, a vertical shaft furnace of the electric resistor type is shown at 10 and is equipped with vertically separated annular electrodes 11 and 12 between which alternating current is caused to flow through an intervening charge of material which fills the bore 13 of the furnace. The upper end of the furnace structure is supplied with a preheating device 14 and a hinged closure member 15 is used to seal the upper extremity of the furnace and prevent the access of air into the furnace chamber during the carrying on of reducing operations therein.

A preliminary preheating device is shown at 16 into which ore, suitably roasted, sintered and intermixed with carbonaceous material, is delivered. A feeding gate 17 automatically controlled by the level of material within the furnace chamber 13 feeds material from the preheating device 16 through the inclined tube 18 into the upper end of the preheater 14 and serves to maintain the preheater 14 in a constantly filled condition.

The lower end of the furnace 10 terminates in a cooling chamber 19 which may be air or water cooled as desired and into which the charge passes as it leaves the lower end of the reducing zone of the furnace. At 20 is shown a water seal which includes a rotatable bowl 21 containing water into which the lower end of the cooling chamber 19 of the furnace dips. A scraper 22 discharges spent residue onto a conveyor 23 leading to a waste receiving station.

As in my companion application, Serial No. 148,801 filed November 17, 1926, I prefer to produce a sintered condition of the ore preliminary to reduction treatment which sintering may be effected as a part or extension of the roasting operation to which zinc ores, and particularly ores of the sulphide type, are subjected. The sintering effect can be obtained by a local intensification of the application of heat to the ore as it passes through the roaster. This preliminary treatment of the ore is carried out on the sintering machine shown at 24 in the drawing. Ore is supplied to the hopper 25 and is fed from the hopper into trays 26 movable along the open upper side of a suction box 27 connected through the pipe 28 with a suitable source of exhaust. An oil burner 29 ignites the sulphur in the ore and the heat generated by the combustion of the sulphur under the action of the down draft of air through the material heats the ore to the necessary temperature to produce sinter.

The sintered ore drops from the end of the sintering machine 24 into a crusher 30 in which the material is crushed into fragments of a suitable size usually approximating that of corn or peas. The crushed ore is delivered into the hopper 31 of a mixing machine and is intermixed with powdered coke, or the like, delivered to the mixer 32 by a conveyor 33. The mixed material is then delivered by the conveyor 34 to the preheater 16 of the furnace 10.

By the sintering operation it is practicable to reduce the sulphur content of the ore approximately to ½ of one per cent or less, which is desirable in the production of a high grade oxide. The sintering operation has the advantage of rendering the ore much more porous than is roasted ore and also makes the ore much more conductive and hence much more responsive to the action of the electric current.

The intermixed sintered ore and carbonaceous material are heated in the preheater 16 to a temperature which will drive off moisture but will not be so high as to injure the metal of which the gate or valve 17 is composed. The material is fed through the inclined passageway 18 in accordance with the level of the material in the furnace chamber and its bridging relation to the contact members 35 of a circuit controlling a motor, not shown, which operates the gate 17. The material thus fed into the preheater 14 is subjected to a further heating operation which raises the temperature considerably higher than the temperature obtained in the preheater 16. This temperature may approximate 1000° C. which is substantially the temperature condition obtaining in the reduction zone of the furnace. By thus bringing the temperature of the material up to that of the reducing zone by means of oil or gas heating, an economy is effected in the use of electrical current for the reducing operation.

When the hot material descends into the space intervening between the electrodes 11 and 12, the action of current passing between the electrodes and through the intervening column of material becomes effective to vaporize the zinc. The zinc vapor thus produced passes out of the chamber 13 through the tuyère passage 36 and is ignited at the exit end 37 of the tube and burns immediately adjacent the end of the tube and within the vertical tube 38. The end of the tuyère tube 37 is arranged substantially in register with a port or opening 39 in the side wall of the vertical tube 38 in the opposite wall of which a door or closure member 40 may be placed to provide further access of air to the vertical tube if needed. The vertical tube 38 leads to a fan 41 which produces in the tube a moderate draft, such as will draw into the opening 39 a sufficient quantity of air to produce complete oxidation of the zinc vapor discharged from the tube end 37 and thereby convert the entire mass of zinc vapor issuing from the tuyère passage 36 into zinc fume. As has been already stated, the draft produced by the fan 41 is of moderate intensity and provides a cooling effect sufficient only to prevent destruction of the iron tube 38 through which the freshly formed oxide fume is conveyed into the fan 41 and through the separator 42 into bags 43 suspended in the bag chamber 44. By thus retaining all the heat possible in the oxidation of the zinc vapor at the opening 39 of the vertical tube 38 and also by burning the zinc vapor in a closed system, such as is provided by the vertical tube 38, a zinc oxide product of moderate and uniform fineness is produced. I have found that a product having a uniform average fineness ranging between .4 and .25 of a micron is readily and invariably produced by this method of operation. A zinc oxide of the moderate fineness named has a high utility in the arts, particularly where the deviation in particle size from the average is not more than .15 of a micron. When used as an ingredient of rubber, an oxide of this fineness produces a desirable time period of cure which is much faster than the relatively slow and unsatisfactory cure produced by the coarse oxides made by the American process and, on the other hand, is slower than the unsatisfactory rapidity which oxides of the fineness below .25 produce in the manufacture of rubber.

A feature of the invention resides in the purity of the zinc oxide obtained. The temperature at which the zinc vapor distills is lower than that at which distillation of sulphur takes place and, since no oxygen gains access to the furnace chamber, no oxidation of the sulphur present into sulphur dioxide can take place. The sulphur therefore remains in the furnace chamber in the form of matte and does not pass out of the furnace with the oxide.

Certain impurities, such as metals ordinarily present with zinc, do distil over with the zinc in small proportions. These substances have a tendency to detract from the white color of the zinc oxide and to thereby interfere with the use of the oxide as a pigment. However, because of the entire absence of sulphur which is characteristic of the oxide produced by this process, it is possible to add to the oxide measured and definitely predetermined quantities of sulphur such as will convert the oxides of metals other than sulphur into the corresponding sulphates which are white in color and do not detract from the use of the oxide as a pigment. The process therefore, as has already been pointed out, lends itself particularly well not only to the complete exclusion of sulphur from the final product, but also to the definite control and utilization of a measured quantity of sulphur added to the oxide for the purpose of converting deleterious substances therein into compounds which do not detract from the usefulness of the zinc oxide as a whole.

What I claim is:

1. The process for producing zinc oxide which comprises heating roasted zinc ore and carbonaceous material in a sealed electric resistor furnace to a temperature between the vaporizing temperature of zinc and the vaporizing temperature of sulphides, and in passing off and directly converting the zinc vapor thus produced into oxide fume.

2. The process of producing zinc oxide substantially free from sulphur which comprises continuously feeding a mixture of sintered zinc ore and carbonaceous material through a furnace, heating the mixture therein in a reducing atmosphere to a temperature which vaporizes the zinc, continuously withdrawing the vapor and the spent material and directly converting the vapor thus produced into oxide.

3. The process of producing zinc oxide which comprises feeding a mixture of sintered zinc ore and carbon through a furnace, heating it therein in a reducing atmosphere to a temperature which vaporizes the zinc but does not affect the sulphides contained in the ore, withdrawing the zinc vapor and directly converting it into zinc oxide.

4. The process of producing zinc oxide which comprises smelting a loose, porous column of mixed carbon and sintered ore in a sealed electric resistance furnace in which the column is passed through a zone in which electrical energy is applied to the column to produce zinc vapor. drawing off the vapor and directly converting it into oxide.

EARL C. GASKILL.